US007751351B2

(12) United States Patent
Taniguchi

(10) Patent No.: US 7,751,351 B2
(45) Date of Patent: Jul. 6, 2010

(54) DISTURBING SIGNAL DETECTING DEVICE FOR DETECTING A DISTURBING SIGNAL AND OFDM RECEIVER USING THE SAME

(75) Inventor: Tomohiko Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1120 days.

(21) Appl. No.: 10/567,893

(22) PCT Filed: Jun. 30, 2005

(86) PCT No.: PCT/JP2005/012024

§ 371 (c)(1),
(2), (4) Date: Feb. 8, 2006

(87) PCT Pub. No.: WO2006/003964

PCT Pub. Date: Jan. 12, 2006

(65) Prior Publication Data
US 2006/0262715 A1 Nov. 23, 2006

(30) Foreign Application Priority Data
Jul. 5, 2004 (JP) ............................. 2004-197567

(51) Int. Cl.
H04B 7/00 (2006.01)

(52) U.S. Cl. ...................................... 370/310; 370/315

(58) Field of Classification Search ................. 370/310, 370/315, 316, 319; 375/130, 140, 147
See application file for complete search history.

(56) References Cited

U.S. PATENT DOCUMENTS

| 5,134,635 | A | * | 7/1992 | Hong et al. | .................. 375/341 |
| 6,064,066 | A | * | 5/2000 | Bevan et al. | ................. 250/345 |
| 7,099,270 | B2 | * | 8/2006 | Yamaguchi | .................. 370/208 |

(Continued)

FOREIGN PATENT DOCUMENTS

EP 1043874 A2 * 10/2000

(Continued)

OTHER PUBLICATIONS

Japanese language International Search Report for PCT/JP2005/012024, dated Oct. 11, 2005.

(Continued)

Primary Examiner—Chi H Pham
Assistant Examiner—Fan Ng
(74) Attorney, Agent, or Firm—RatnerPrestia

(57) ABSTRACT

A disturbing signal detecting device that detects a disturbing signal and improves error correcting capability for a signal including an interference, and an OFDM receiver that improves reception power for a signal including an interference are disclosed. The disturbing signal detecting device and OFDM receiver perform an IFFT computation for a transmission line characteristic calculated from pilot signals by an IFFT computing unit. A threshold processing part substitutes "0" for a value of a time-base signal obtained as an IFFT computation result, if the value exceeds a threshold. An FFT computing unit performs an FFT computation for a signal processed by the threshold processing part, to convert the signal to a frequency-base signal. An interference detector interpolates timewise and frequencywise the frequency-base signal obtained from the FFT computing unit, to calculate a disturbing signal added to the OFDM signal band.

15 Claims, 13 Drawing Sheets

U.S. PATENT DOCUMENTS

| | | | |
|---|---|---|---|
| 7,173,983 B1* | 2/2007 | Meyer | 375/340 |
| 2002/0118771 A1* | 8/2002 | Larsson | 375/267 |
| 2005/0113087 A1* | 5/2005 | Rick et al. | 455/434 |
| 2005/0157801 A1* | 7/2005 | Gore et al. | 375/260 |
| 2005/0213692 A1* | 9/2005 | Zhidkov | 375/346 |
| 2006/0116095 A1* | 6/2006 | Henriksson | 455/223 |

FOREIGN PATENT DOCUMENTS

| | | |
|---|---|---|
| JP | 11-215095 A | 8/1999 |
| JP | 11-252040 A | 9/1999 |
| JP | 11-346205 A | 12/1999 |
| JP | 2000-115087 A | 4/2000 |
| JP | 2001-44965 A | 2/2001 |
| JP | 2002-158631 A | 5/2002 |
| JP | 2004-120789 A | 4/2004 |
| JP | 2004-140739 A | 5/2004 |
| WO | WO 03/088538 A1 | 10/2003 |

OTHER PUBLICATIONS

"Chapter 2: Overview of the ISDB-T System in the standard specification", "Transmission System for Digital Terrestrial Television Broadcasting" (ARIB STD-B31 version 1.1), p. 8, lines 2-9, by Association of Radio Industries and Businesses.

"2.4.3 Maximum Likelihood Demodulation on White Gaussian Channel" in "Chapter 2: Fundamental Concept of Code Theory, Code Theory", pp. 37 and 38, compiled by The Institute of Electronics, Information and Communication Engineers, written by Hideki Imai (in Japanese).

* cited by examiner

DISTURBING SIGNAL DETECTING DEVICE FOR DETECTING A DISTURBING SIGNAL AND OFDM RECEIVER USING THE SAME

This application is a U.S. National Phase application of PCT International Application PCT/JP2005/012024.

TECHNICAL FIELD

The present invention relates to a disturbing signal detecting device for detecting a disturbing signal in a received signal with Orthogonal Frequency Division Multiplexing (OFDM, hereinafter) and to an OFDM receiver using this detecting device, especially to a technology for detecting and improving a disturbing signal when a received signal degrades in demodulation performance due to a frequency-selective disturbing signal.

BACKGROUND ART

Currently, digitization of terrestrial broadcasting is in practical use. An OFDM transmission system has been adopted as a terrestrial digital television broadcasting method in Japan and Europe. The OFDM transmission system in Japanese terrestrial digital television broadcasting has been established as a standard. The standard is disclosed in lines 2 to 9, page 8, under Chapter 2: *Overview of the ISDB-T System* in the standard specification "*Transmission System for Digital Terrestrial Television Broadcasting*" (ARIB STD-B31 version 1.1) by Association of Radio Industries and Businesses.

A description is made for the conventional technology related to the present invention. An OFDM transmission system modulates and demodulates a signal by allocating the data to plural carriers (carrier waves) orthogonal to each other. Each carrier is modulated by a modulation method such as QPSK (Quadrature Phase Shift Keying), QAM (Quadrature Amplitude Modulation), or DQPSK (Differential Quadrature Phase Shift Keying).

If a synchronous modulation method such as QPSK or QAM mentioned above is adopted as a modulation method for carriers, pilot signals are inserted in the transmission signal. Pilot signals are inserted at regular intervals frequencywise and timewise. The transmission line characteristic is calculated using pilot signals when demodulating the OFDM signal. The transmission line characteristic calculated from pilot signals is interpolated frequencywise and timewise to derive a reference signal for all the carriers. Then, a transmission data series is obtained from the differences in amplitude and phase. Further, the data series demodulated undergoes error-correction coding.

Consequently, digital broadcasting provides favorable reception quality as compared to the conventional analog television broadcasting.

However, the signal level of a specific carrier can drop under the influence of a reflected wave called a multipath, depending on a receiving environment of the broadcast waves. If disturbing signals such as analog television broadcast waves exist in the same frequency band, the demodulation performance can deteriorate under the influence of the disturbing signals. The signal level can drop due to a strong multipath interference, or an interference signal can exist at the frequency position to which a pilot signal has been inserted. In this case in particular, the transmission line characteristic to be a reference for demodulation may be estimated wrongly, and thus the demodulation performance can largely decrease as compared to a case free from a multipath interference and disturbing signals.

Therefore, a method is known that detects an interference affecting a transmission signal, calculates a weighting amount corresponding to an interference amount detected, and performs soft decision by weighting the demodulated signal, to improve error correcting capability of the error correcting part. This conventional makeup is disclosed in pages 37 and 38, under 2.4.3 *Maximum Likelihood Demodulation on White Gaussian Channel*, in Chapter 2: *Fundamental Concept of Code Theory, Code Theory*, compiled by The Institute of Electronics, Information and Communication Engineers, written by Hideki Imai (in Japanese).

As a method of detecting disturbing signals, a method is known that makes hard decision for the signal demodulated, calculates the difference between the signal demodulated and that after hard decision, and uses the information on the dispersion of each carrier obtained by integrating the difference value timewise. The above-mentioned conventional makeup is disclosed in Japanese Patent Unexamined Publication No. 2001-44965, for example.

Another method is known that calculates an error between the average amplitude of pilot signals and an amplitude of each pilot signal, and detects presence or absence of an interference conforming to the frequency of a pilot signal. If an interference exists, a pilot signal affected by an interference is not used, but a value obtained by interpolating those free from an interference, prior to and subsequent to the affected one, is used instead. The above-mentioned conventional makeup is disclosed in Japanese Patent Unexamined Publication No. H11-252040, for example.

As aforementioned, the conventional disturbing signal detecting device and OFDM receiver detect a frequency-selective interference by information on dispersion of OFDM carriers, to use for error correction. Alternatively, the devices replace pilot a signal affected by disturbing signals with a signal obtained by interpolating those not affected, according to information on an error in the pilot signal. With these methods, an attempt is made to prevent disturbing signals from deteriorating reception performance.

However, as in the makeup described in Japanese Patent Unexamined Publication No. 2001-44965, which detects disturbing signals from the difference between signals demodulated and those after hard decision, the difference can be calculated between a signal with its mapping point different from the transmission point and the signal demodulated. Meanwhile, the makeup involves an averaging process for data obtained in a certain period of time in order to alleviate the influence of wrong estimation, and thus calculating the instantaneous amount of disturbing signals can be difficult.

In the makeup described in Japanese Patent Unexamined Publication No. H11-252040, which detects an error between the average amplitude of pilot signals and an amplitude of each pilot signal, instantaneously calculating the precise amount of disturbing signals can be difficult.

SUMMARY OF THE INVENTION

A disturbing signal detecting device according to the present invention extracts pilot signals periodically arranged in OFDM signals, by symbol; performs inverse fast Fourier transform (IFFT, hereinafter) for a signal representing the transmission line characteristic calculated from pilot signal; and converts the signal to a time-base one. The device sets a threshold to the time-base signal obtained from an IFFT computation, substitutes zero ("0" hereinafter) for a signal with a value larger than the threshold, and performs fast Fourier transform (FFT, hereinafter) to convert the signal to that in the frequency domain.

Next, after calculating the amplitude or power of signals obtained by an FFT computation, the device performs an interpolation process timewise and frequencywise. Then, the device calculates the signal obtained after interpolation by OFDM carrier as the amount of disturbing signals in the OFDM signal band. The information on the amount of disturbing signals enables improving error correcting capability for signals including an interference as a result that disturbing signals are detected by utilizing the information in soft decision for OFDM signals.

Here, in order to improve reception performance for OFDM signals, an interleave process may be performed that rearranges signals timewise and frequencywise. In this case, as a result that the interleave process performed for OFDM signals is applied to disturbing signals detected as well, data can be linked to interference information frequencywise and timewise.

The disturbing signal detecting device according to the present invention allows a value that is interference information averaged frequencywise, to be used as the amount of disturbing signals included in the entire OFDM signal band. This makeup further detects disturbing signals to improve error correcting capability for signals including an interference.

In the disturbing signal detecting device according to the present invention, a process may be added of multiplying the signals immediately before and after an IFFT computation by a window function. Introducing a window function allows the setting range of a threshold to be further expanded if a threshold process is performed for time-base signals obtained from an IFFT computation.

The disturbing signal detecting device according to the present invention is equipped with an IFFT computing unit, threshold processing part, FFT computing unit, subtraction processing part (or simply "subtracter" hereinafter), and an interference detector. The IFFT computing unit performs an IFFT computation for a transmission line characteristic calculated from pilot signals. The threshold processing part compares a time-base signal obtained from an IFFT computation by the IFFT computing unit, with the threshold, and substitutes "0" for the value if the time-base signal is smaller than the threshold. The FFT computing unit performs an FFT computation for a signal processed by the threshold processing part, to convert it to a frequency-base signal. The subtraction processing part subtracts a frequency-base signal obtained by the FFT computing unit, from a signal with the transmission line characteristic calculated from pilot signals. The interference detector interpolates a signal obtained from the subtracter timewise and frequencywise, to calculate an interference signal added to the OFDM signal band.

This makeup detects disturbing signals to improve error correcting capability for signals including an interference.

The disturbing signal detecting device according to the present invention is equipped with a transmission line estimating part, IFFT computing unit, threshold processing part, and FFT computing unit. The transmission line estimating part obtains a transmission line characteristic calculated from pilot signals, and interpolates the transmission line characteristic calculated from pilot signals, timewise and frequencywise based on the arrangement rule of pilot signals. The IFFT computing unit performs an IFFT computation for a signal representing the transmission line characteristic of all the OFDM carriers obtained from the transmission line estimating part. The threshold processing part compares a time-base signal obtained from an IFFT computation by the IFFT computing unit, with the threshold, and substitutes "0" for the value if the time-base signal exceeds the threshold. The FFT computing unit performs an FFT computation for a signal processed by the threshold processing part, and convert it to a frequency-base signal to calculate a disturbing signal.

This makeup detects disturbing signals to improve error correcting capability for signals including an interference.

The disturbing signal detecting device according to the present invention is equipped with a transmission line estimating part, IFFT computing unit, threshold processing part, FFT computing unit, and subtraction processing part. The transmission line estimating part obtains a transmission line characteristic calculated from pilot signals, and interpolate the transmission line characteristic calculated from pilot signals, timewise and frequencywise based on the arrangement rule of pilot signals. The IFFT computing unit performs an IFFT computation for a signal representing the transmission line characteristic of all the OFDM carriers obtained from the transmission line estimating part. The threshold processing part compares a time-base signal obtained from an IFFT computation by the IFFT computing unit with the threshold, and substitutes "0" for the value if the time-base signal is smaller than the threshold. The FFT computing unit performs an FFT computation for a signal processed by the threshold processing part, to convert it to a frequency-base signal. The subtraction processing part subtracts a frequency-base signal obtained by the FFT computing unit, from a signal representing the transmission line characteristic calculated from pilot signals, to calculate a disturbing signal.

This makeup detects disturbing signals to allow improving error correcting capability for signals including an interference.

An OFDM receiver-according to the present invention is equipped with a received signal FFT computing unit (or simply, "FFT computing unit" hereinafter), pilot extractor, transmission line characteristic estimating part (or "transmission line estimating part", hereinafter), divider, soft decision part, error correcting part, and any of the devices for detecting disturbing signals mentioned above. The received signal FFT computing unit converts a received signal to a frequency-domain signal. The pilot extractor extracts a pilot signal from the frequency-domain signal, to calculate a transmission line characteristic of the carrier in which the pilot signal existed. Transmission line characteristic estimating part interpolates the transmission line characteristics calculated by the pilot extractor timewise and frequencywise, to calculate an estimate for the transmission line characteristic of all the OFDM carriers. The divider divides an output from the received signal FFT computing unit, by the estimate of the transmission line characteristic. The soft decision part calculates likelihood based on the distance from a transmitted signal point to a received signal point. The error correcting part performs error correction using the likelihood. The likelihood is corrected according to a disturbing signal detected by the disturbing signal detecting device.

This makeup enables improving reception power for a signal including an interference.

REFERENCE MARKS IN THE DRAWINGS

Figure 1:
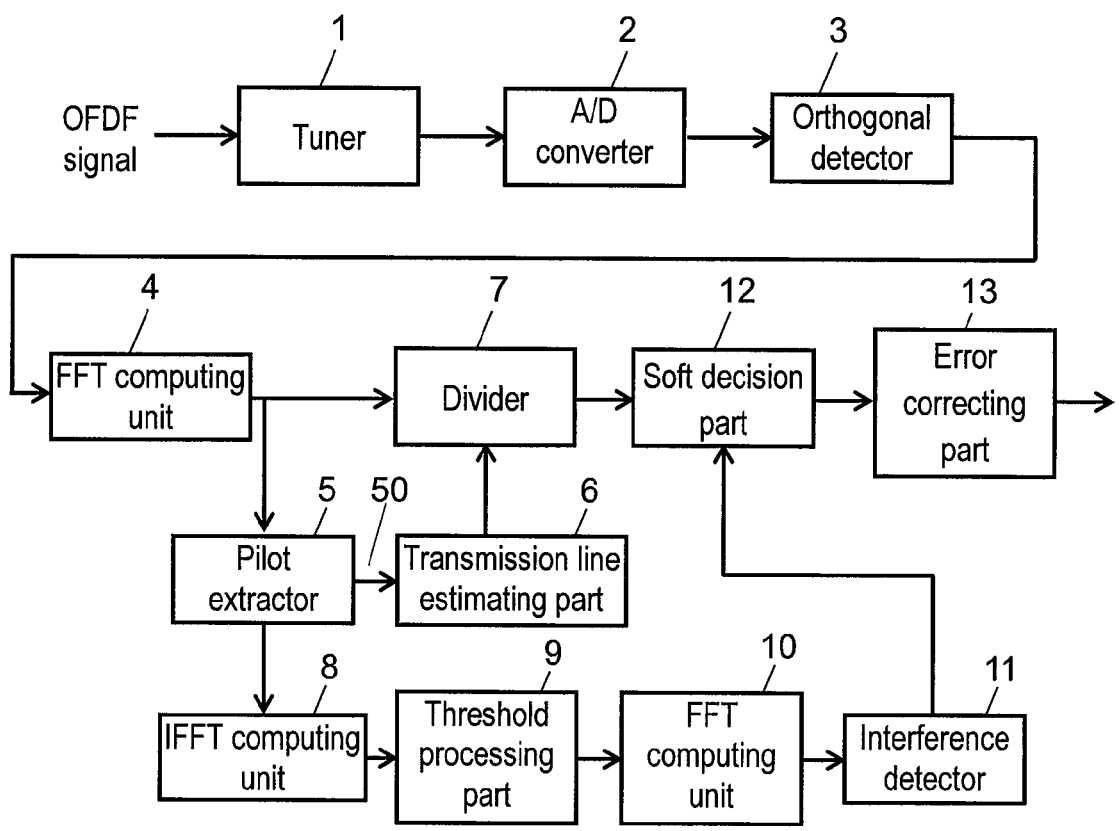
FIG. 1 is a block diagram illustrating a makeup of an OFDM receiver including the disturbing signal detecting device according to the first exemplary embodiment of the present invention.

1 Tuner
2 A/D converter
3 Orthogonal detector
4 FFT computing unit (Received signal FFT computing unit)
5 Pilot extractor
6 Transmission line estimating part (Transmission line characteristic estimating part)
7 Divider
8, 20 IFFT computing unit
9, 18 Threshold processing part
10, 21 FFT computing unit
11 Interference detector
12, 41, 42 Soft decision part
13 Error correcting part
14 Deinterlieve part
15 Signal quality calculating part
16 Windowing part
17 Inverse windowing part
19 Subtraction processing part (Subtracter)

DETAILED DESCRIPTION OF PREFERRED EMBODIMENTS

Hereinafter, a description is made for some exemplary embodiments according to the present invention with reference to drawings.

First Exemplary Embodiment

First, a description is made for an example makeup for realizing a disturbing signal detecting device and OFDM receiver according to the present invention. FIG. 1 is a block diagram illustrating the makeup of an OFDM receiver including the disturbing signal detecting device according to the first exemplary embodiment of the present invention. In FIG. 1, the disturbing signal detecting device is equipped with tuner 1, A/D converter 2, orthogonal detector 3, FFT computing unit (received signal FFT computing unit) 4, pilot extractor 5, transmission line estimating part 6, divider 7, IFFT computing unit 8, threshold processing part 9, FFT computing unit 10, interference detector 11, soft decision part 12, and error correcting part 13.

Tuner 1 selects an OFDM signal received. A/D converter 2 converts a signal selected by the tuner to a digital signal and outputs it. Orthogonal detector 3 orthogonally detects an OFDM signal and output it. FFT computing unit 4 converts a signal obtained from orthogonal detector 3 to a frequency-domain signal and outputs it. Pilot extractor 5 extracts a pilot signal periodically inserted into the OFDM signal. Pilot extractor 5 further compares the pilot signal extracted with a reference value, calculates the transmission line characteristic 50 of a carrier including the pilot signal, and outputs it. Transmission line estimating part 6 interpolates timewise and frequencywise the transmission line characteristic 50 of the carrier in which the pilot signal calculated by pilot extractor 5 existed, calculates an estimate for the transmission line characteristics of all OFDM carriers, and outputs it. Divider 7 divides the signal converted to the frequency-domain signal by FFT computing unit 4, by the estimate for the transmission line characteristic estimated by transmission line estimating part 6, and outputs the result.

IFFT computing unit 8 performs an IFFT computation for a signal representing the transmission line characteristic calculated by pilot extractor 5, convert it to a time-domain signal, and output it. An IFFT computation is performed for a signal obtained for one symbol period from pilot extractor 5. For a signal obtained from pilot extractor 5, its pilot signals are frequencywise arranged discretely and periodically, and thus are smaller in number as compared to the total number of OFDM carriers. In Japanese terrestrial digital broadcasting, for example, pilot signals are arranged for every 12 carriers frequencywise, and the total number of signals to be input to IFFT computing unit 8 is 1/12 of the total number of OFDM carriers. In the case of the transmission parameter (referred to as "mode 3," having a total of 5,617 carriers), which has the largest number of OFDM carriers in Japanese terrestrial digital broadcasting system, the number of pilot carriers per one symbol is 468 or 469. Therefore, the number of points for an IFFT computation is to be set to 512 in this embodiment, but not limited in the present invention.

Threshold processing part 9 substitutes "0" for a signal with a value obtained from IFFT computing unit 8 larger than a threshold preliminarily set, and outputs the original value. If the value of the signal obtained from IFFT computing unit 8 is smaller than the threshold, the original value is output. If the value obtained from IFFT computing unit 8 is a complex number, threshold processing part 9 compares the magnitude of the vector with the threshold, and substitutes "0" for both the real and imaginary parts if the magnitude is smaller than the threshold.

FFT computing unit 10 performs an FFT computation for the output from threshold processing part 9, converts it to a frequency-domain signal, and output it. The number of points for an FFT computation in FFT computing unit 10 is assumed to be the same as that in IFFT computing unit 8.

Here, a description is made for a concrete example of the processes in pilot extractor 5, IFFT computing unit 8, threshold processing part 9, and FFT computing unit 10, with reference to FIGS. 2 through 5. The description is made for a case in which the total number of carriers for OFDM signals is 5,617, the interval between carriers is approximately 1 kHz, and pilot signals are arranged for every 12 carriers frequencywise.

Figure 2:
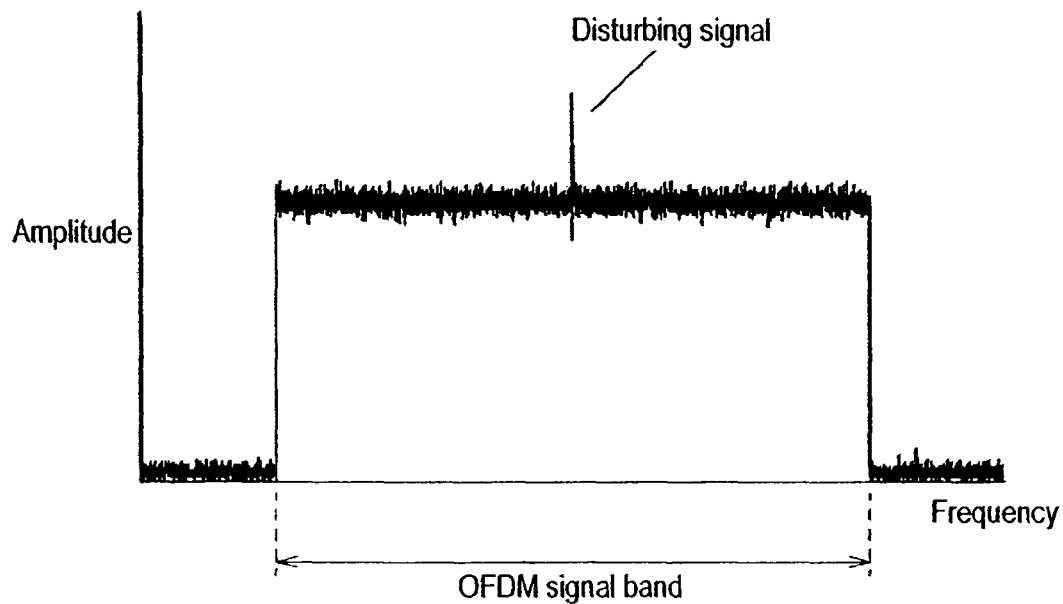
FIG. 2 illustrates an OFDM signal to which a disturbing signal is added to the roughly central part of the band in the same embodiment.

FIG. 2 is a conceptual diagram illustrating the transmission line characteristic (amplitude characteristic) for a signal under the influence of a disturbing signal in this embodiment. A certain amount (approximately 15 dB in C/N ratio) of white noise has been added to the entire band of OFDM transmission signals. The disturbing signal exists in the roughly central part of the OFDM signal band.

Figure 3:
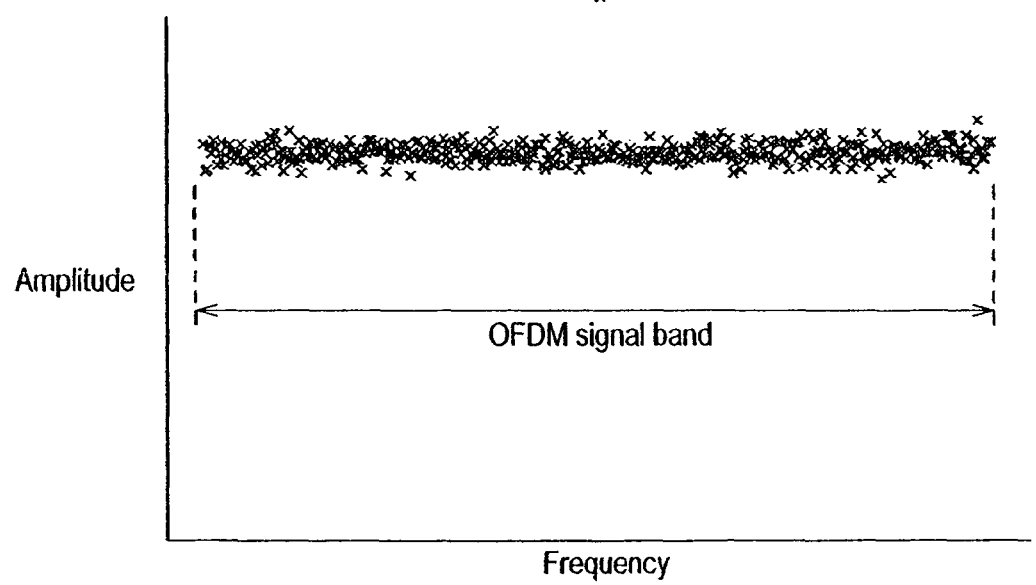
FIG. 3 illustrates a pilot signal extracted from the OFDM signal shown in FIG. 2 in the same embodiment.

FIG. 3 illustrates the transmission line characteristic (amplitude characteristic) obtained from a pilot signal included in OFDM signals in FIG. 2 with "x" marks in this embodiment. The characteristic shown in FIG. 3 corresponds to the output from pilot extractor 5 in FIG. 1. As shown in FIG. 3, if the position of a disturbing signal is the same or near that of a pilot signal, the presence of a disturbing signal can be detected from the amplitude characteristic of the pilot signal.

Figure 4:
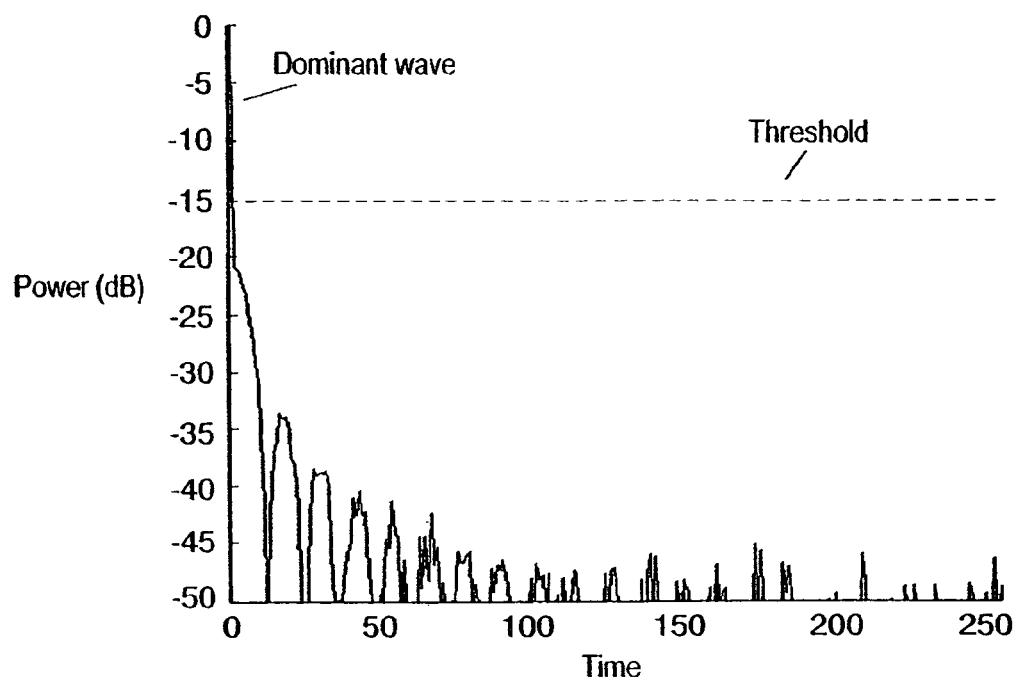
FIG. 4 illustrates an amplitude characteristic obtained by performing an IFFT computation for the pilot signal shown in FIG. 3 in the same embodiment.

FIG. 4 illustrates the result of an IFFT computing process for the pilot signal in FIG. 3 in this embodiment. The vertical axis indicates the signal power after logarithmic conversion; and the horizontal axis, time in IFFT point. The signal in FIG. 4 is generally referred to as a "delay profile" or the like, to be sometimes used for grasping the propagation path characteristic of a signal. This makeup is disclosed in Japanese Patent Unexamined Publication No. 2000-115087, for example. The result of an IFFT computation, where the number of IFFT points (512 points) of complex signals are obtained, is frequencywise symmetric, and thus FIG. 4 shows only 256 points. Correction is made so that the peak value of the computation result is 0 dB. FIG. 4 shows the threshold to be set by threshold processing part 10 as well.

Threshold processing part 10 substitutes "0" for the corresponding complex signal value if the signal power value in FIG. 4 is larger than a threshold. The threshold is to be the peak value of a power, calculated from the IFFT computation result, minus 15 dB, for example. Here, the threshold may be set for the magnitude of the vector as the IFFT computation result. This threshold process allows changing the level for distinguishing between OFDM signal components and interference components.

In the above description, the threshold is to be set for the peak value of the IFFT computation result. However, the threshold may be set for the computation result obtained when the transmission line characteristic of OFDM signals is constantly at a reference level over the entire band. This case is not affected by fluctuation of the power peak value when OFDM signals are strengthened or weakened by delayed waves.

Figure 5:
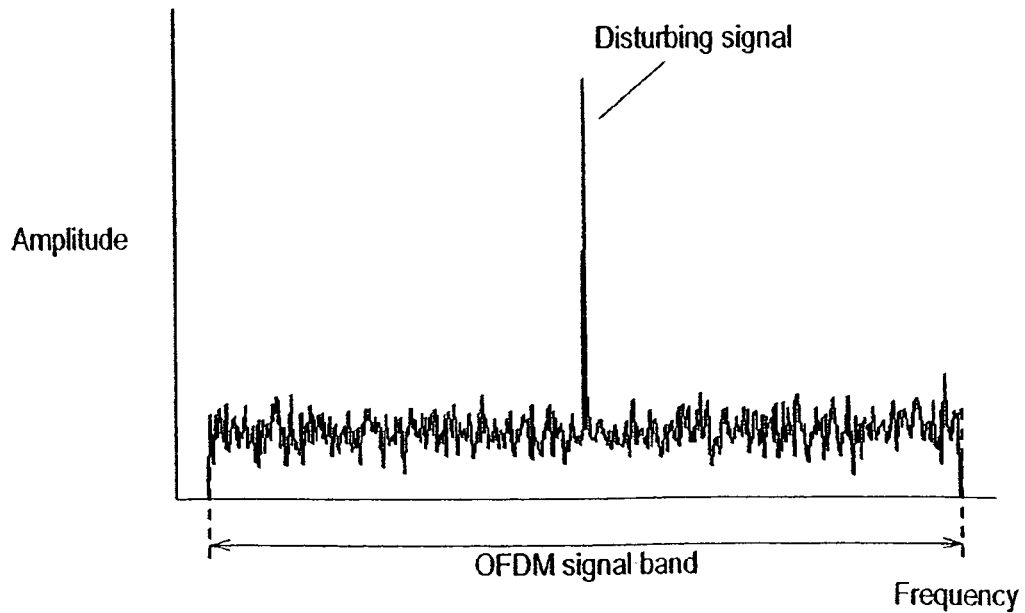
FIG. 5 illustrates an amplitude characteristic obtained by performing an FFT computation after a threshold process performed for the signal shown in FIG. 4 in the same embodiment.

Next, a result is shown in FIG. 5 of an FFT computation by threshold processing part 9 after a threshold process by FFT computing unit 10 for the signal in FIG. 4. As shown in FIG. 5, by means of calculating the magnitude of the vector as the FFT computation result, a disturbing signal in the band and the amount of white noise added can be detected. Here, the number of computation points in FFT computing unit 10 is the same as that in IFFT computing unit 8, and thus the frequency position of the output signal from FFT computing unit 10 conforms to that from pilot extractor 5.

Figure 6:
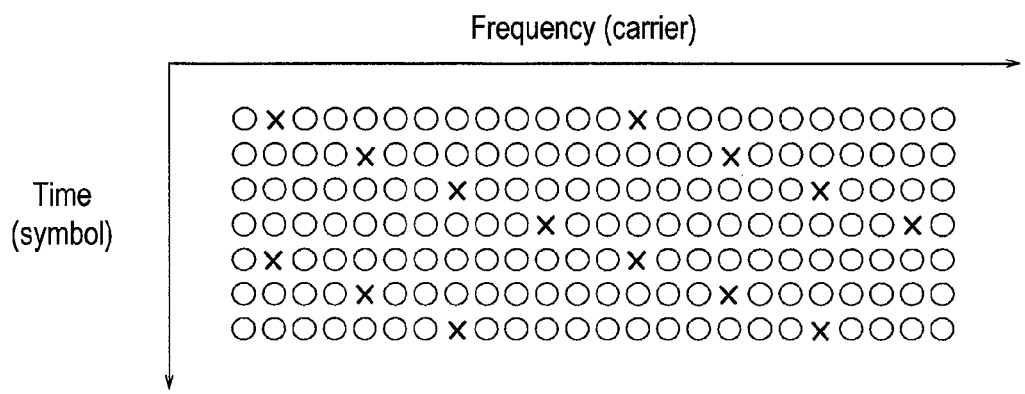
FIG. 6 illustrates OFDM carriers from which interference information is available and not available in the same embodiment.

Next, a description is made for interference detector 11. Interference detector 11 performs an interpolation process for a signal obtained from FFT computing unit 10 timewise and frequencywise. An output signal from FFT computing unit 10 is obtained by processing a signal indicating a transmission line characteristic obtained from pilot extractor 5. Accordingly, the output signal represents information periodical frequencywise and timewise, like a pilot signal. FIG. 6 illustrates the relationship between disturbing signal information obtained from FFT computing unit 10 and the carrier arrangement for OFDM transmission signals, in this embodiment. The horizontal axis in the figure indicates a frequency axis (direction of a carrier); and the vertical axis, a time axis (direction of a symbol). An "x" mark in the figure shows a position of OFDM carrier from which interference information has been obtained; and a circle mark, not. As aforementioned, the position of OFDM carriers from which interference information in FIG. 6 has been obtained is the same as that of OFDM symbols where the pilot signal is arranged. The interference information for a carrier at a circle-marked position is obtained by interpolating the interference information for a carrier at an "x"-marked position. Interference information may be linearly interpolated frequencywise and timewise, or using filtering with an appropriate tap number. Alternatively, a value of interference information obtained that is averaged in a certain short symbol period such as five to ten symbol periods may be output as a disturbing signal.

Soft decision part 12 performs soft decision for demodulated data obtained from divider 7, to output the result obtained. Here, soft decision refers to a method that calculates an Euclidean distance between a received signal point, and a transmitted signal point, and judges that the likelihood is higher as the Euclidean distance is smaller. Alternatively, the distance between a received signal point and a transmitted signal point calculated with a method other than by a Euclidean distance may be used as the likelihood.

Soft decision part 12 further corrects the soft decision result using interference information obtained from interference detector 12. For example, soft decision part 12 sets the threshold according to the size of the interference information, and corrects the likelihood first obtained lower for a carrier including a large interference that exceeds the threshold. Alternatively, soft decision part 12 can change the weighting amount of the likelihood according to the size of the interference information.

Error correcting part 13 performs error correction using the soft decision result for the received data obtained from soft decision part 12.

Figure 7:
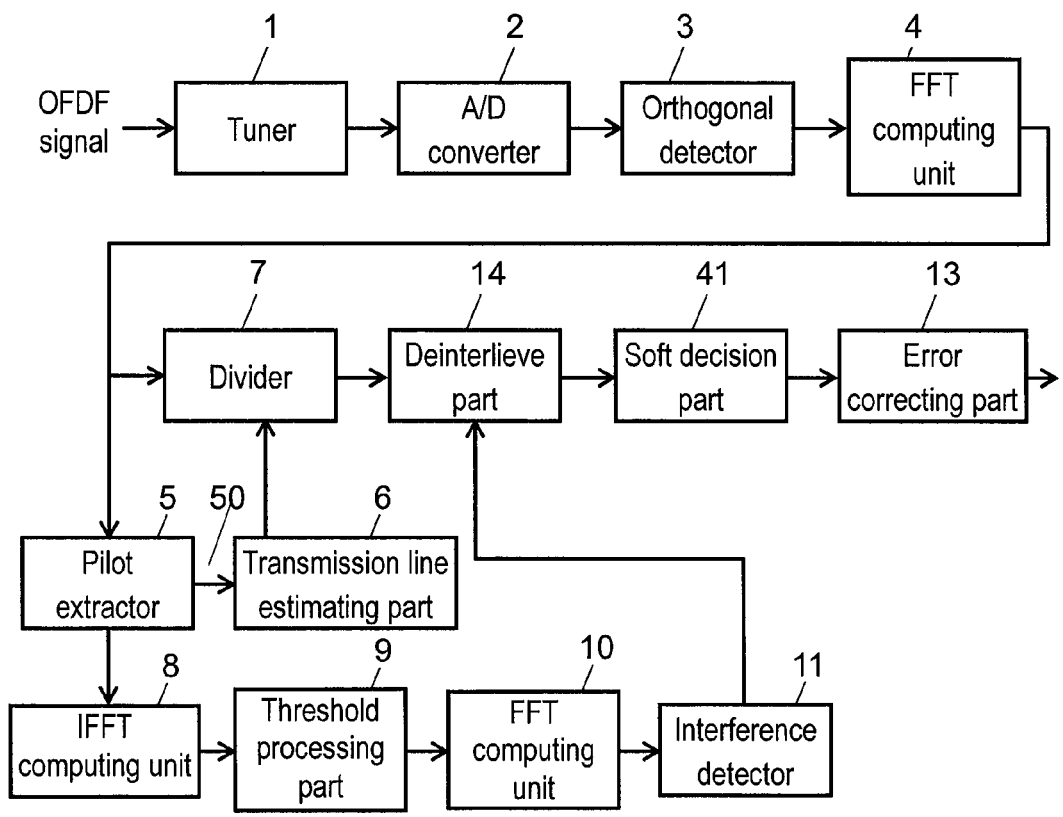
FIG. 7 is a block diagram illustrating another makeup of the OFDM receiver including the disturbing signal detecting device according to the first exemplary embodiment of the present invention.

The above describes an example makeup of an OFDM receiver including the disturbing signal detecting device according to the first exemplary embodiment of the present invention, with reference to FIG. 1. However, the makeup as shown in FIG. 7 can be used as well. FIG. 7 differs from FIG. 1 in that deinterlieve part 14 is provided. In FIG. 7, for a component with a makeup same as in FIG. 1, the same mark is given to omit its description.

Deinterlieve part 14 performs a deinterlieve process for a received signal having undergone an interleave process. The interleave process refers to a process that rearranges data timewise or frequencywise according to a certain rule when transmitting an OFDM signal, in order to improve the reception characteristic of the OFDM signal. If an interleave process has been performed when transmitting a signal, the signal is required to be restored when received, which is a process referred to as "deinterlieve process."

Deinterlieve part 14 rearranges demodulated data obtained from divider 7 to the data arrangement before the interleave process at the transmission side. In this case, the interference information obtained from interference detector 11 needs to be rearranged according to the same rule as that of the arrangement. Thus performing a deinterlieve process for demodulated data and interference information allows maintaining the relationship between the demodulated data and interference information. Deinterlieve part 14 outputs the demodulated data and interference information after a deinterlieve process.

For interference information, arrangement can be made only frequencywise, not timewise. In this case, a time-average value of interference information is desirably calculated over a period corresponding to an interleave period.

While soft decision part 12 in FIG. 1 uses interference information obtained from interference detector 11, soft decision part 41 in FIG. 7 obtains demodulated data and interference information obtained from deinterlieve part 14 and then processes them.

Second Exemplary Embodiment

A description is made for the makeup of an OFDM receiver including the disturbing signal detecting device according to the second exemplary embodiment of the present invention.

Figure 8:
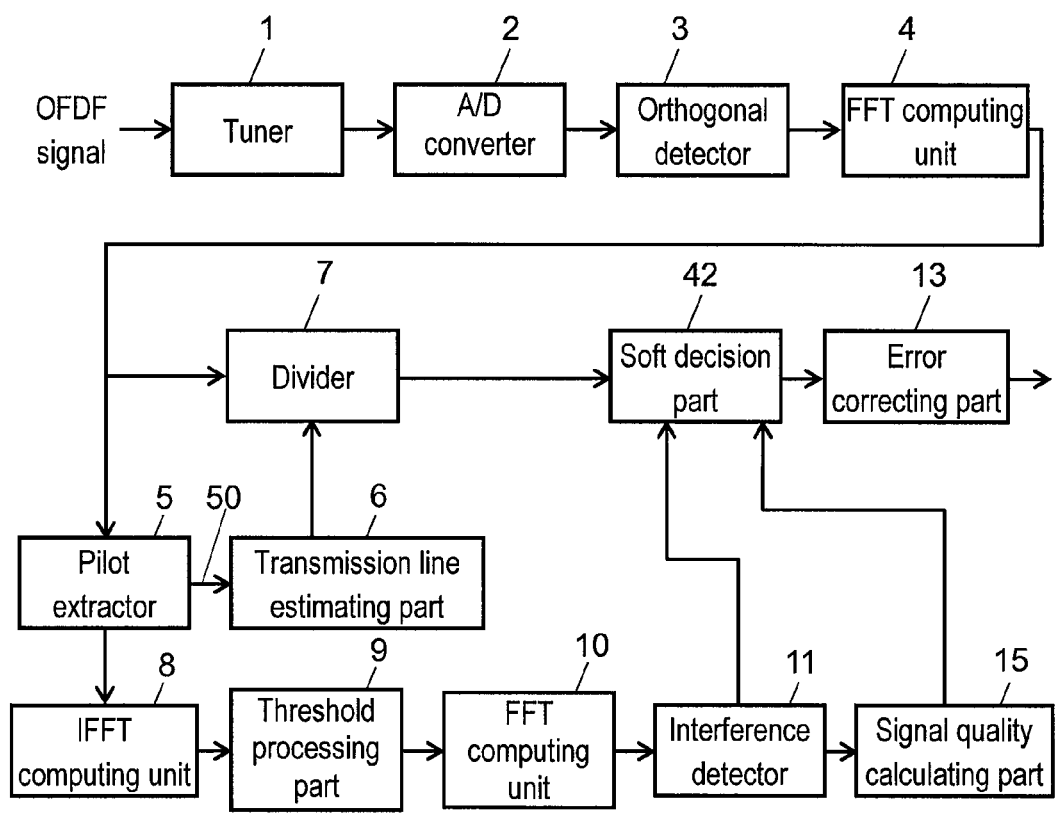
FIG. 8 is a block diagram illustrating the makeup of an OFDM receiver including the disturbing signal detecting device according to the second exemplary embodiment of the present invention.

FIG. 8 is a block diagram illustrating the makeup of an OFDM receiver including the disturbing signal detecting device according to the second exemplary embodiment of the present invention. In FIG. 8, the disturbing signal detecting device is equipped with tuner 1, A/D converter 2, orthogonal detector 3, FFT computing unit 4, pilot extractor 5, transmission line estimating part 6, divider 7, IFFT computing unit 8, threshold processing part 9, FFT computing unit 10, interference detector 11, soft decision part 42, error correcting part 13, and signal quality calculating part 15. In FIG. 8, for a component with a makeup same as in FIG. 1, the same mark is given to omit its description. The makeup in FIG. 8 differs from that in FIG. 1 in that signal quality calculating part 15 is connected to interference detector 11, and that soft decision part 42 judges for a signal from divider 7 based on signals from interference detector 11 and signal quality calculating part 15.

A detailed description is made for signal quality calculating part 15.

Signal quality calculating part 15 calculates the signal quality of OFDM signals. Interference detector 43 calculates disturbing signal information included in a signal for each of the plural OFDM carriers. Meanwhile, signal quality calculating part 15 calculates a frequencywise average value for disturbing signal information obtained from interference detector 11, to determine the signal quality of the entire band of signals receiving. A value for each symbol or an average value in a certain symbol period is to be the signal quality.

Soft decision part 42 can perform soft decision according to frequencywise interference information obtained from interference detector 11 and timewise interference information obtained from signal quality calculating part 15.

In this embodiment, the description is made for a case where signal quality information obtained from signal quality calculating part 15 is used by soft decision part 42. However, the information can be used for other purposes such as being monitored as an index for determining the direction of an antenna to be installed for receiving a broadcast, for example.

Third Exemplary Embodiment

A description is made for an OFDM receiver including the disturbing signal detecting device according to the third exemplary embodiment of the present invention.

Figure 9:
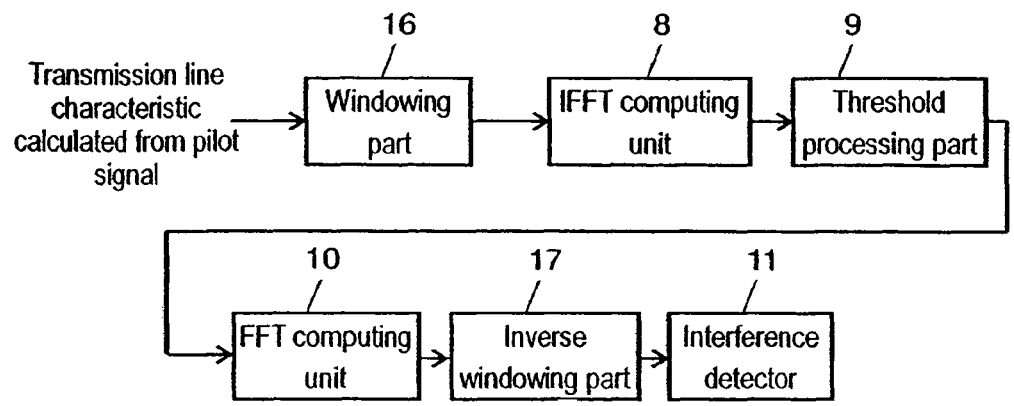
FIG. 9 is a block diagram illustrating the makeup of an OFDM receiver including the disturbing signal detecting device according to the third exemplary embodiment of the present invention.

FIG. 9 is a block diagram illustrating a partial makeup of an OFDM receiver including the disturbing signal detecting device according to the third exemplary embodiment of the present invention. The makeup shown in FIG. 9 is composed of pilot extractor 5, IFFT computing unit 8, threshold processing part 9, FFT computing unit 10, and interference detector 11, all in the makeup shown in FIG. 1, with windowing part 16 and inverse windowing part 17 added. A detailed description is made for windowing part 16 and inverse windowing part 17.

Figure 10:
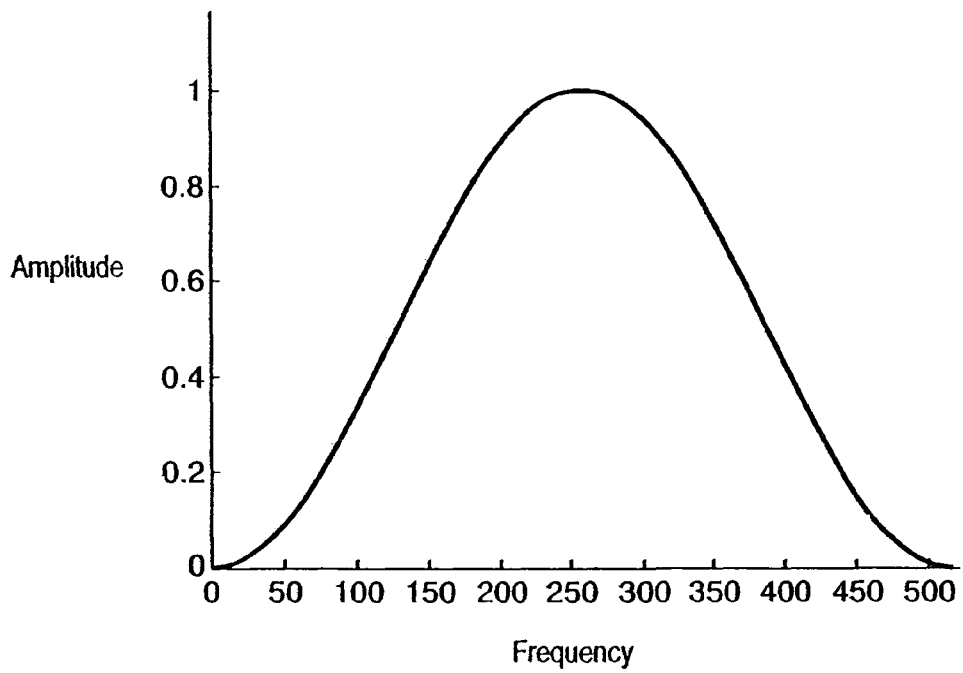
FIG. 10 illustrates an example of a window function used by the windowing part in the same embodiment.

Windowing part 16 performs a windowing process for a signal to undergo an IFFT computation. The makeup in this embodiment obtains a pilot signal to perform a windowing process for the pilot signal. A description is made for a windowing process. FIG. 10 illustrates the shape of a window function used when windowing in this embodiment, where the horizontal axis indicates frequency in IFFT point; and the vertical axis, normalized amplitude value with its peak as 1. FIG. 10 shows a window function called a Hanning window. The Hanning window has the same value as the number of points in the IFFT computing unit at the stage subsequent to windowing part 16 frequencywise of the window function, and has a value of 1.0 centrally. The value approaches 0.0 smoothly as separating from the center.

The makeup of this embodiment multiplies a pilot signal obtained as a complex number, by a window function value (real number). If the total number of pilot signals is smaller than the number of points for IFFT or an FFT computation, the insufficient parts are filled with the value with both its real and imaginary parts of "0." Contrarily, if the total number of pilot signals is larger than the number of points for IFFT or an FFT computation, the center (value 1.0) of the window function is to be multiplied by a pilot signal at the roughly central position out of those arranged frequencywise. Consequently, the window function value by which the pilot signal at the position of the carrier with the lowest frequency is multiplied can be roughly the same as that with the highest frequency.

In FIG. 10, a Hanning window is taken as an example. However, a window function with another shape can be adopted.

Figure 11A:
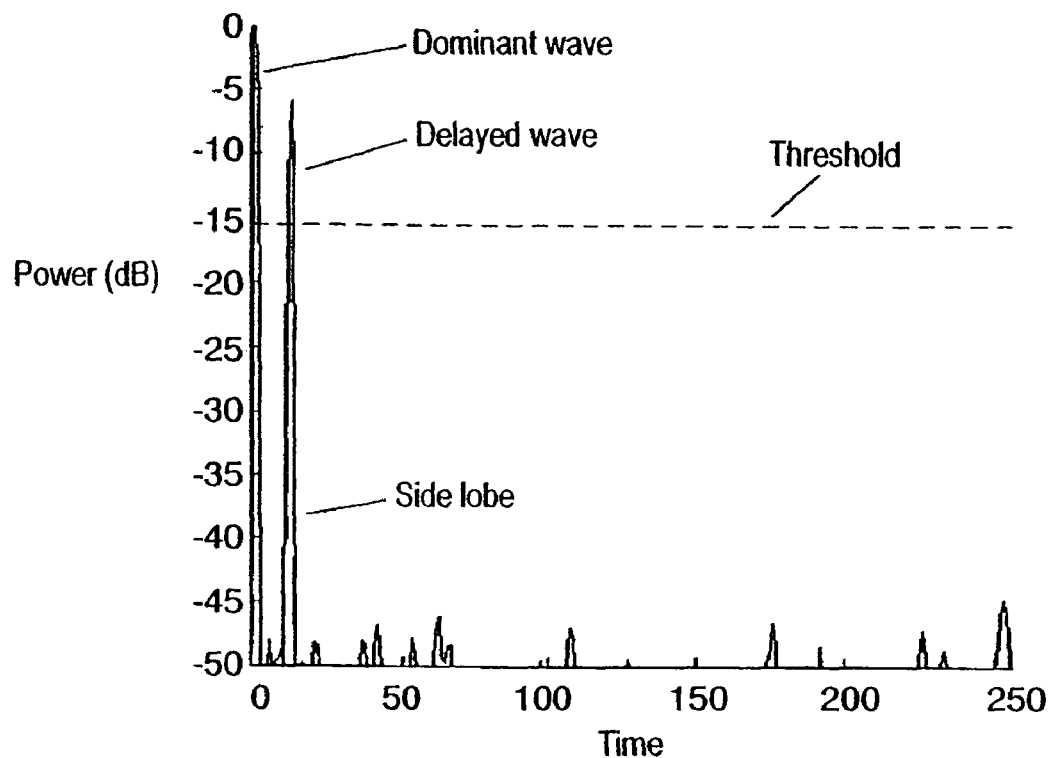
FIG. 11A illustrates a result of an IFFT computation when a windowing process has been performed in the same embodiment.
Figure 11B:
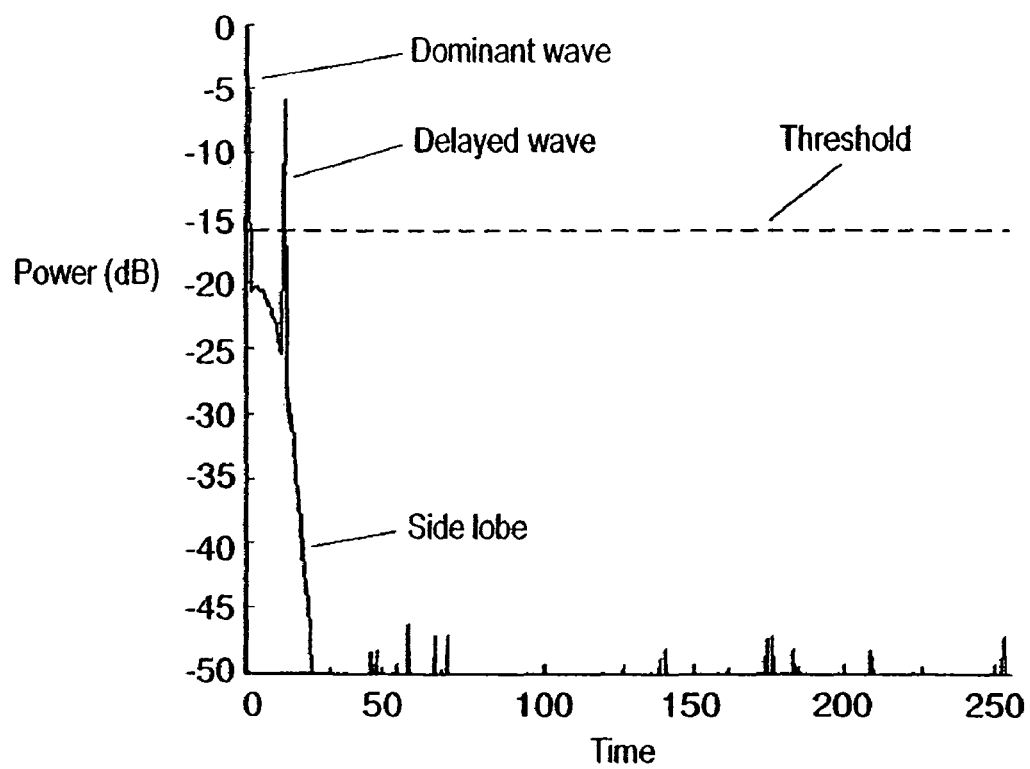
FIG. 11B illustrates a result of an IFFT computation when a windowing process has not been performed in the same embodiment.

FIGS. 11A and 11B illustrate output signals that are pilot signals extracted from OFDM signals having undergone a multipath interference in this embodiment that have been converted to time-domain signals by IFFT computing unit 8. FIG. 11A shows a case where the process by windowing part 16 has been performed; and FIG. 11B, not. In each case, the vertical axis indicates power value logarithmicaly converted; and the horizontal axis, time in IFFT point. The side lobe of output values from IFFT computing unit 8 is found to be narrowed by windowing part 16. Windowing part 16 enables a threshold set by threshold processing part 9 to be set low. If windowing part 16 is not provided, output from IFFT computing unit, expanding in the region lower than approximately −20 dB, overlaps the threshold.

Next, inverse windowing part 17 is described. Inverse windowing part 17 multiplies a signal output from FFT computing unit 10, by an inverse window function, and outputs the result. The inverse window function used by inverse windowing part 17 for multiplication is an inverse number of the window function having been used by windowing part 16.

Figure 12:
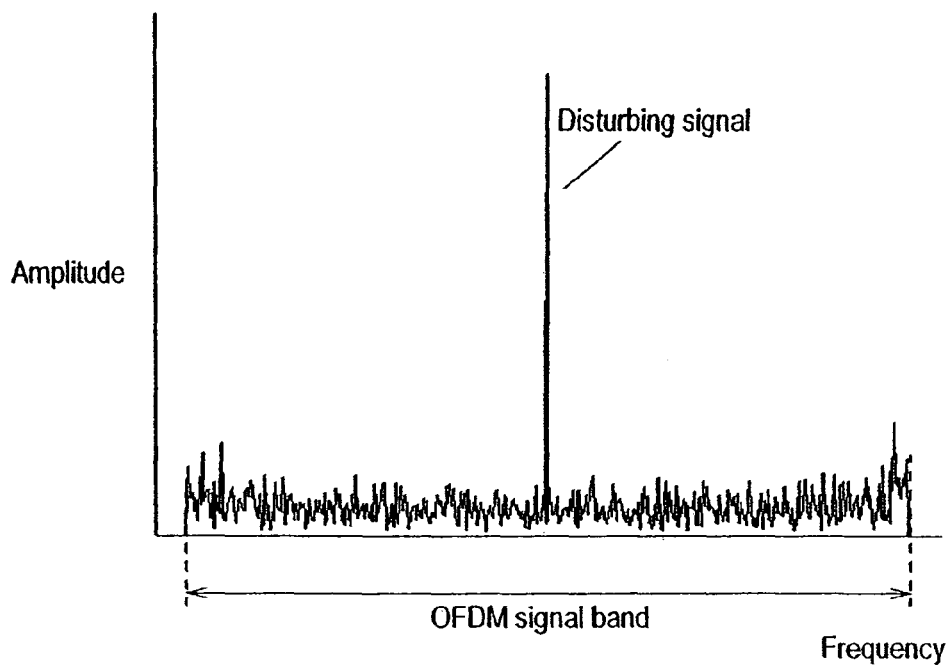
FIG. 12 illustrates an example output signal from the windowing part in the same embodiment.

FIG. 12 illustrates an example output signal from inverse windowing part 16 in this embodiment. In the same way as in FIG. 5 of the first exemplary embodiment, a disturbing signal is added to the roughly central part of the OFDM transmission signal band, and white noise is added to the entire band. The threshold to be set by threshold processing part 9 is −24 dB, as a result of comparing with the peak value of the result of computation by IFFT computing unit 8. FIG. 12 illustrates the amplitude of a signal obtained from inverse windowing part 16, calculated for each frequency. As shown in FIG. 12, a disturbing signal in the band and the amount of white noise can be detected.

Here, a description is omitted for how to utilize the interference information obtained in this makeup, because it is the same as those in the first and second exemplary embodiments.

Fourth Exemplary Embodiment

Figure 13:
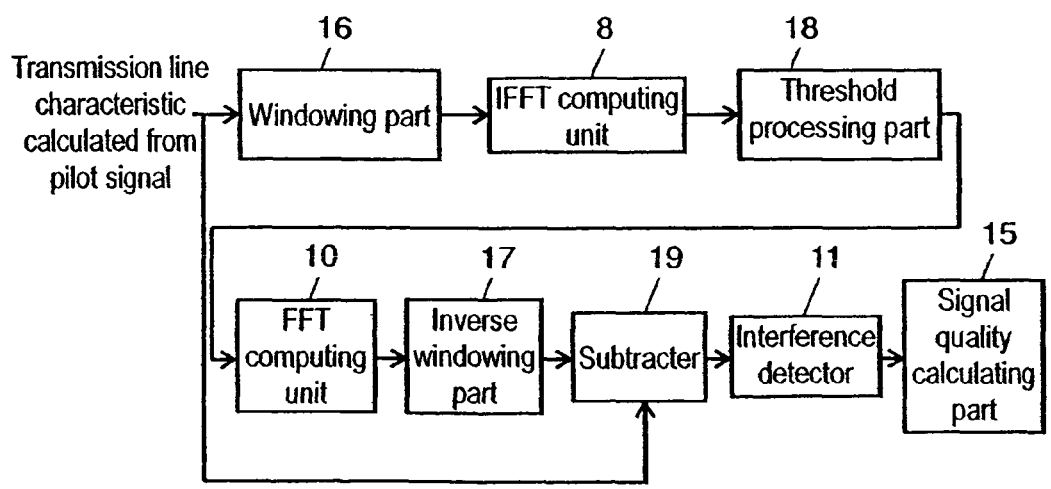
FIG. 13 is a block diagram illustrating a partial makeup of the OFDM receiver including the disturbing signal detecting device according to the fourth exemplary embodiment of the present invention.

A description is made for an OFDM receiver including the disturbing signal detecting device according to the fourth exemplary embodiment of the present invention. FIG. 13 is a block diagram illustrating a partial makeup of an OFDM receiver including the disturbing signal detecting device according to the fourth exemplary embodiment of the present invention. In FIG. 13, for a component with a makeup same as in FIG. 9, the same mark is given to omit its description. The makeup in FIG. 13 differs from that in FIG. 9 in threshold processing part 18, subtracter 19, and signal quality calculating part 15. A detailed description is made for threshold processing part 18 and subtracter 19. Signal quality calculating part 15 has the same makeup as that of signal quality calculating part 15 in FIG. 8.

Threshold processing part 9 in FIGS. 1, 7, 8, and 9 compares the result computed by IFFT computing unit 8 with the threshold, and substitutes "0" for a value larger than the threshold. Contrarily, threshold processing part 18 obtains a result computed by IFFT computing unit 8, and if the value is smaller than the threshold preliminarily set, outputs "0"; and if larger, its original value. If the value obtained from IFFT computing unit 8 is a complex number, threshold processing part 18 compares the magnitude of the vector with the threshold.

Subtracter 19 obtains output from inverse windowing part 17 and a pilot signal, and then, subtracts the signal obtained from inverse windowing part 17, from the pilot signal. Subtracter 19 performs a subtraction process for a pilot signal and an output signal from the inverse windowing part, both existing at the same frequency position and obtained as a complex number, and outputs the result.

Figure 14:
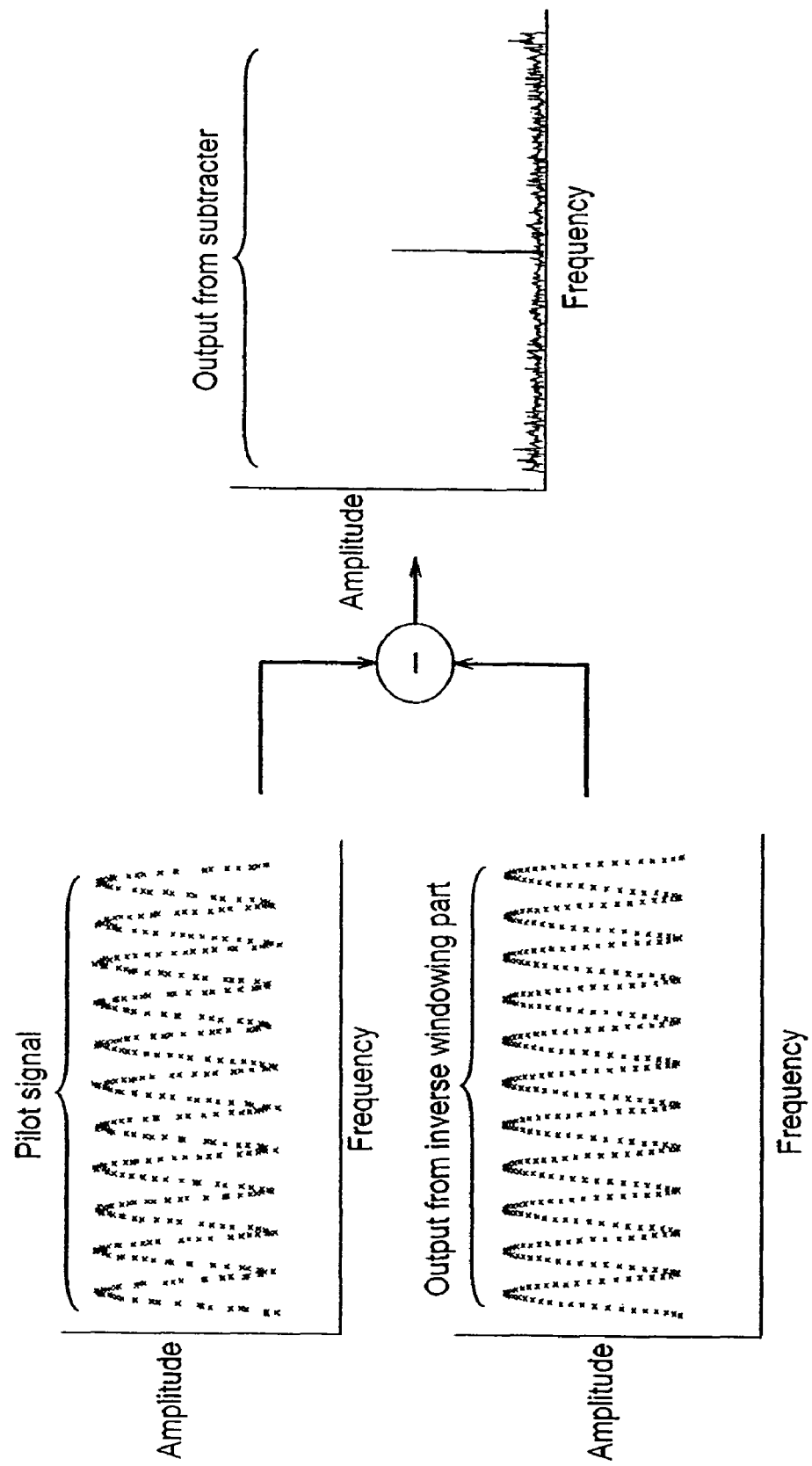
FIG. 14 illustrates an example signal before and after the process by the subtracter in the same embodiment.

FIG. 14 illustrates a pilot signal obtained by windowing part 16 and subtracter 19, a signal obtained by subtracter 19, and an output example from subtracter 19, in this embodiment. With each signal being output as a complex number as aforementioned, the amplitude is calculated for each frequency component to illustrate.

In the signal used in FIG. 14, a multipath interference is added to the OFDM signal, and a disturbing signal is added to the roughly central part of the band simultaneously. White noise is further added to the entire band. Frequency information such as a disturbing signal added to OFDM signals can be detected from the amplitude information on an output value from subtracter 19 in FIG. 14.

Here, a description is omitted for how to utilize the interference information obtained in this makeup, because it is the same as those in the first and second exemplary embodiments.

Fifth Exemplary Embodiment

Figure 15:
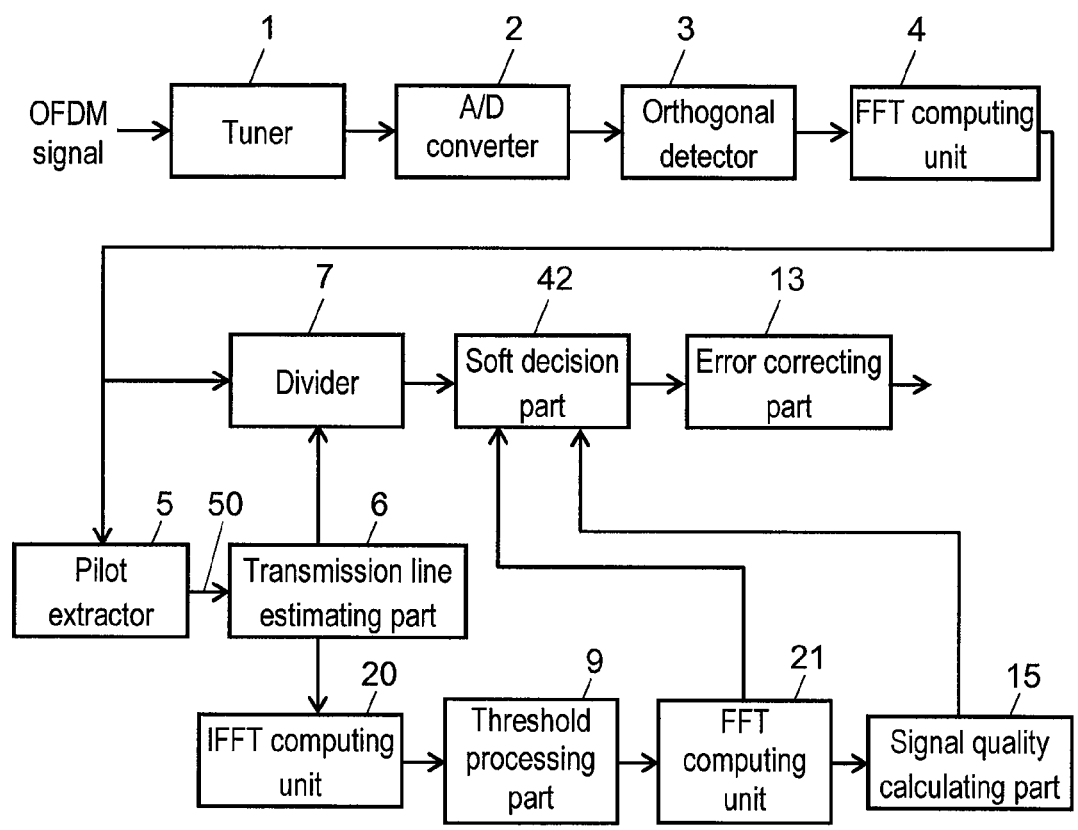
FIG. 15 is a block diagram illustrating a makeup of the OFDM receiver including the disturbing signal detecting device according to the fifth exemplary embodiment of the present invention.

A description is made for an OFDM receiver including the disturbing signal detecting device according to the fifth exemplary embodiment of the present invention. FIG. 15 is a block diagram illustrating the makeup of an OFDM receiver including the disturbing signal detecting device according to the fifth exemplary embodiment of the present invention. In FIG. 15, for a component with a makeup same as in FIG. 1, the same mark is given to omit its description. The makeup in FIG. 15 differs from that in FIG. 1 in soft decision part 42, IFFT computing unit 20, FFT computing unit 21, and signal quality calculating part 15. Soft decision part 42 has the same makeup as that in FIG. 8 except that one of the input signals is from FFT computing unit 21. Signal quality calculating part 15 has the same makeup as that in FIG. 8.

IFFT computing unit 20 obtains information on a transmission line characteristic from transmission line estimating part 6. IFFT computing unit 8 with the makeup in the first to fourth exemplary embodiments obtain signals of the same number of pilot signals included in one symbol period for OFDM signals, from pilot extractor 5. Meanwhile, IFFT computing unit 20 in this embodiment obtains a signal representing a transmission line characteristic for one symbol, from transmission line estimating part 6. The signal obtained by IFFT computing unit 20 from transmission line estimating part 6 is the same as that obtained by divider 7 from transmission line estimating part 6. For example, in a case of the transmission parameter (referred to as "mode 3", the total number of carriers: 5,617) with the largest number of OFDM carriers, the number same as in the description for the first exemplary embodiment, the number of points for an IFFT computation is 8,192. In this embodiment, the number of computation points required in FFT computing unit 21 is the same as that in FFT computing unit 4, where FFT computing unit 4 and FFT computing unit 21 can be commonly used.

Threshold processing part 9 performs the same process as in the description for the makeup in the first to third exemplary embodiments. However, the number of computation points in IFFT computing unit 20 is increased, and so is the the number of signal points to be processed in one symbol period.

FFT computing unit 21 performs an FFT computation with the same number of computation points as that in IFFT computing unit 20, for a signal obtained from threshold processing part 9, and outputs the result. The outputs from FFT computing unit 10 with the makeup in the first to third exemplary embodiments are discrete frequencywise and timewise, thus requiring an interpolation process by interference detector 11. In this embodiment, however, interference information on all the OFDM carriers is available, thus dispensing with interpolation.

A value obtained by averaging values obtained from FFT computing unit 21 in a certain short symbol period such as five to ten symbol periods may be output to soft decision part 42 as a disturbing signal.

Figure 16:
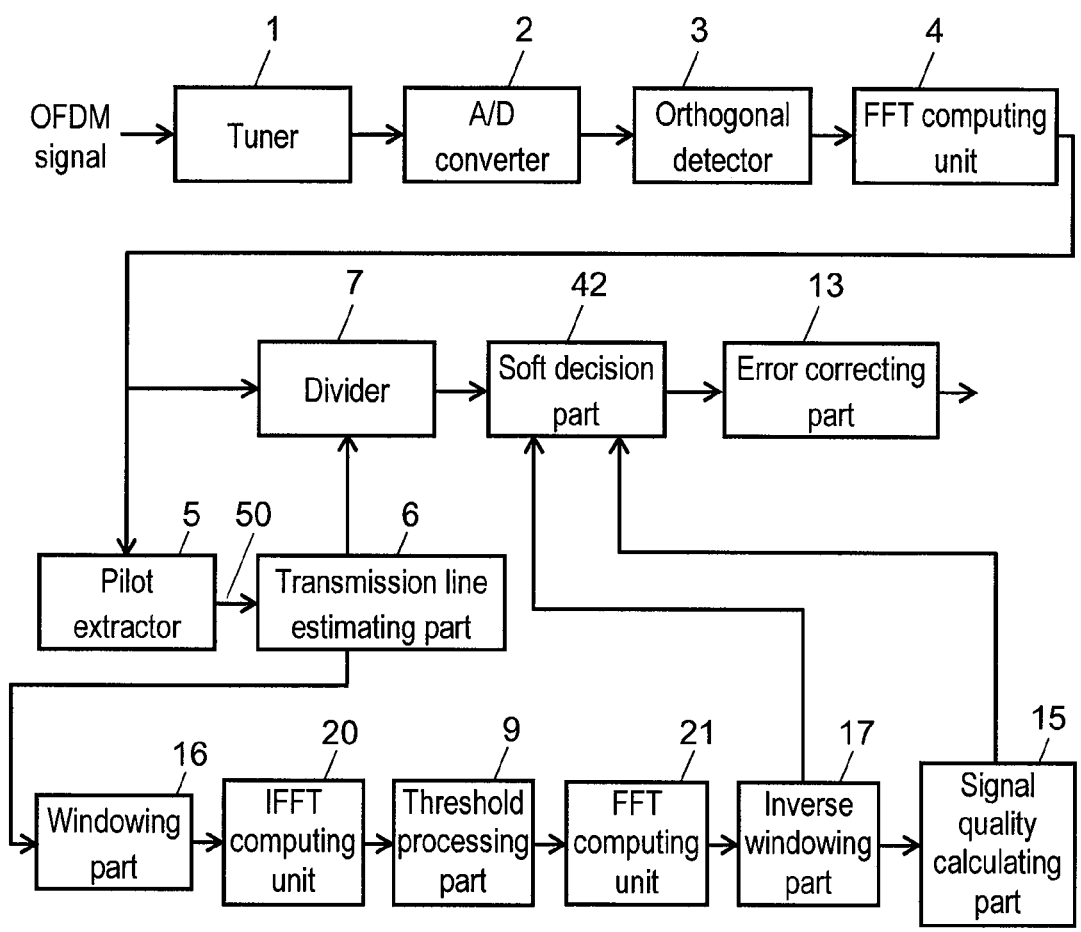
FIG. 16 is a block diagram illustrating another makeup of the OFDM receiver including the disturbing signal detecting device according to the fifth exemplary embodiment of the present invention.

This embodiment calculates interference information based on an interpolated transmission line characteristic, and thus interference information with higher accuracy is available as compared to the makeup in the first to third exemplary embodiments. FIG. 16 is another block diagram illustrating the makeup of an OFDM receiver including the disturbing signal detecting device in this embodiment. As shown in FIG. 16, windowing part 16 and inverse windowing part 17 can be added. Although the number of points for a window function used increases according to the number of points for an IFFT computation and an FFT computation, the effect to be obtained is the same as in the third exemplary embodiment. This embodiment is further different from that in FIG. 15 in that an input signal to soft decision part 42 is from inverse windowing part 17.

Sixth Exemplary Embodiment

Figure 17:
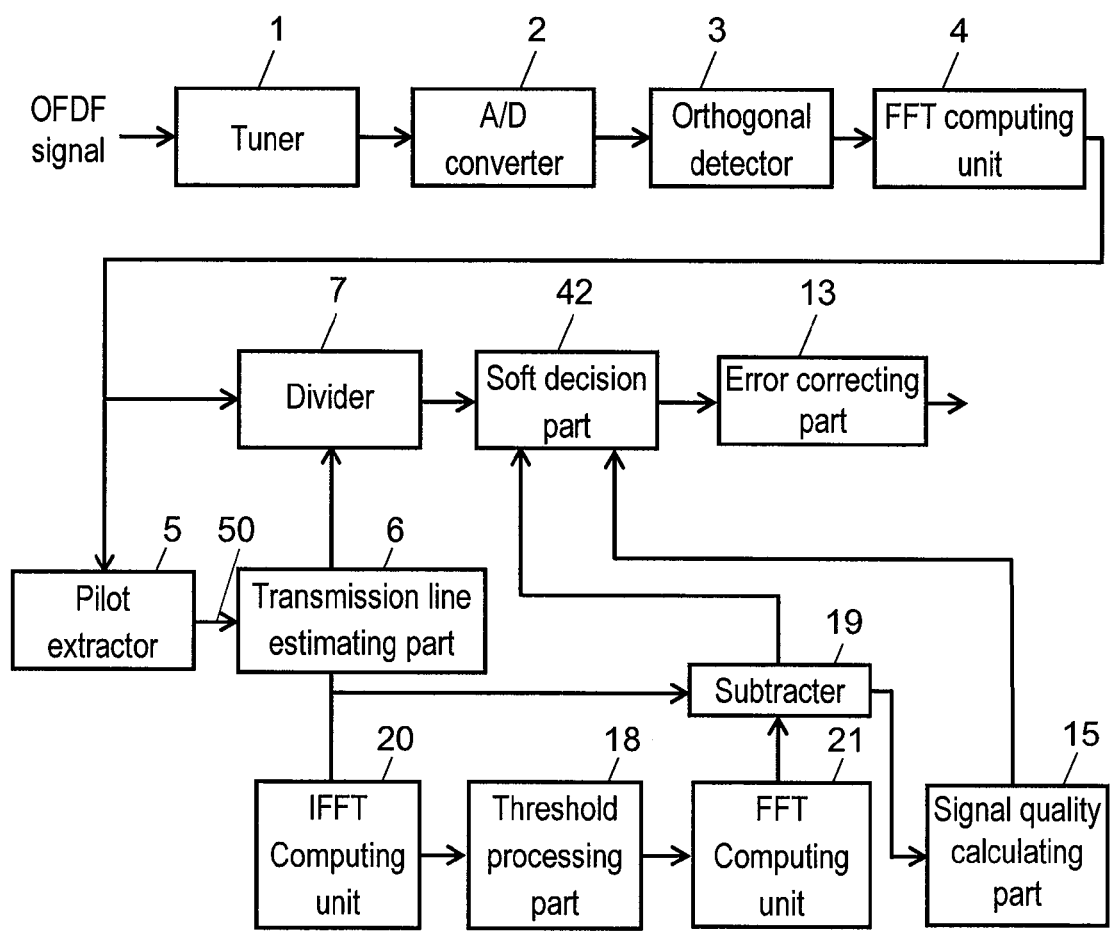
FIG. 17 is a block diagram illustrating a makeup of the OFDM receiver including the disturbing signal detecting device according to the sixth exemplary embodiment of the present invention.

A description is made for an OFDM receiver including the disturbing signal detecting device according to the sixth exemplary embodiment of the present invention. FIG. 17 a block diagram illustrating the makeup of an OFDM receiver including the disturbing signal detecting device according to the sixth exemplary embodiment of the present invention. In FIG. 17, for a component with a makeup same as in FIG. 15, the same mark is given to omit its description. The makeup in FIG. 17 differs from that in FIG. 15 in threshold processing part 18 and subtracter 19. Threshold processing part 18 and subtracter 19 have the same makeups as those in FIG. 13.

IFFT computing unit 20 obtains a signal indicating a transmission line characteristic for one symbol from transmission line estimating part 6. Threshold processing part 18 obtains a computation result by IFFT computing unit 20, and if the value is smaller than a threshold preliminarily set, outputs "0"; and if larger, its original value. Threshold processing part 18 performs the same process as that in the description for the makeup in the fourth exemplary embodiment. However, the number of computation points in IFFT computing unit 20 is increased, and so is the number of signal points processed in one symbol period.

FFT computing unit 21 performs an FFT computation with the same number of computation points as in IFFT computing unit 20 for a signal obtained from threshold processing part 18, and outputs the result. The output from FFT computing unit 10 with the makeup in the fourth exemplary embodiment is discrete frequencywise and timewise, thus requiring an interpolation process by interference detector 11. In this embodiment, however, interference information on all the OFDM carriers is available, thus dispensing with interpolation.

Subtracter 19 obtains output from FFT computing unit 21 and a signal from transmission line estimating part 6, and then subtracts a signal obtained from FFT computing unit 21, from a signal obtained from transmission line estimating part 6. Subtracter 19 performs a subtraction process for a signal from transmission line estimating part 6 and an output signal from FFT computing unit 21, both existing at the same frequency position and obtained as a complex number, and outputs the result.

A value obtained by averaging values obtained from subtracter 19 in a certain short symbol period such as five to ten symbol periods may be output to soft decision part 42 as a disturbing signal.

Figure 18:
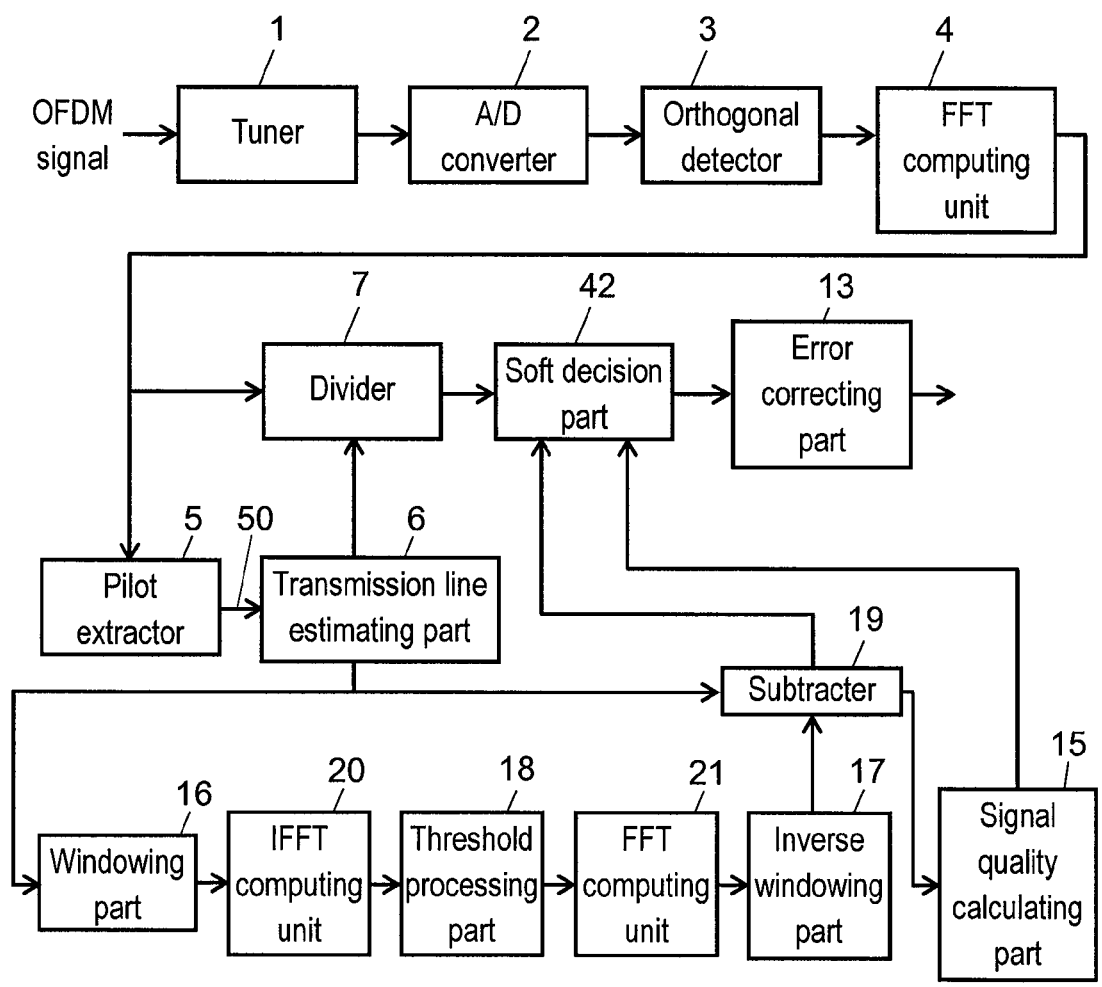
FIG. 18 is a block diagram illustrating another makeup of the OFDM receiver including the disturbing signal detecting device according to the sixth exemplary embodiment of the present invention.

This embodiment calculates interference information based on an interpolated transmission line characteristic, and thus interference information with higher accuracy is available as compared to the makeup in the fourth exemplary embodiment. FIG. 18 is another block diagram illustrating the makeup of an OFDM receiver including the disturbing signal detecting device in this embodiment. As shown in FIG. 18, windowing part 16 and inverse windowing part 17 can be added. Although the number of points for a window function used increases according to the number of points for an IFFT computation and an FFT computation, the effect to be obtained is the same as in the fourth exemplary embodiment.

INDUSTRIAL APPLICABILITY

As mentioned above, a disturbing signal detecting device and OFDM receiver according to the present invention can detect the amount of disturbing signals existing in the OFDM signal band with a high degree of accuracy. In particular, the process can be performed in the unit of symbol, thus preventing wrong estimation for the amount of disturbing signals, and dispensing with a process of averaging disturbing signals obtained in a certain period of time. Consequently, reception performance can be improved when demodulating OFDM signals with a disturbing signal timewise fluctuating added, and thus the devices are useful as a receiver and the like using the Orthogonal Frequency Division Multiplexing transmission system.

The invention claimed is:

1. A disturbing signal detecting device in which a plurality of carriers having frequencies orthogonal to each other in a transmission band are modulated with allocated information signal, the device receives an OFDM transmission signal with a known pilot signal periodically inserted for the plurality of carriers modulated with the information signal, and detects a disturbing signal included in the signal received, comprising:
    an IFFT computing unit for performing an IFFT computation for a transmission line characteristic calculated from the pilot signal;
    a threshold processing part that compares a time-base signal obtained as a result of an IFFT computation by the IFFT computing unit, with a threshold, and if the time-base signal exceeds the threshold, substitutes zero for a value of the signal;
    an FFT computing unit that performs an FFT computation for the signal processed by the threshold processing part and converts to a frequency-base signal;
    an interference detector that interpolates timewise and frequencywise the frequency-base signal obtained from the FFT computing unit, and calculates a disturbing signal added to an OFDM signal band;
    a windowing part that multiplies the transmission line characteristic calculated from the pilot signal, by a window function; and
    an inverse windowing part that multiplies the frequency-base signal obtained from the FFT computing unit, by an inverse number of the window function multiplied in the windowing part.

2. The disturbing signal detecting device as claimed in claim 1, further comprising:
    a signal quality calculating part that calculates an average value of information on the frequencywise disturbing signal obtained from the interference detector, as a level of a disturbing signal for an entire signal band.

3. The disturbing signal detecting device as claimed in claim 1, further comprising:
    a signal quality calculating part that calculates an average value of information on the frequencywise disturbing signal obtained from the interference detector, as a level of a disturbing signal for an entire signal band.

4. An OFDM receiver that includes:
a received signal FFT computing unit that converts a received signal to a frequency-domain signal;
a pilot extractor that extracts a pilot signal from the frequency-domain signal and calculates a transmission line characteristic of a carrier in which the pilot signal existed;
a transmission line characteristic estimating part that interpolates timewise and frequencywise the transmission line characteristic calculated by the pilot extractor, and calculates an estimate for a transmission line characteristic of all OFDM carriers;
a divider that divides the output from the received signal FFT computing unit, by the estimate for the transmission line characteristic;
a soft decision part that calculates likelihood based on a distance from a transmitted signal point to a received signal point; and
an error correcting part that performs error correction using the likelihood, further comprising the disturbing signal detecting device as claimed in one of claim 1 and claim 5, wherein the OFDM receiver corrects the likelihood according to the disturbing signal calculated by the interference detector included in the disturbing signal detecting device.

5. A disturbing signal detecting device in which a plurality of carriers having frequencies orthogonal to each other in a transmission band are modulated with allocated information signal, the device receives an OFDM transmission signal with a known pilot signal periodically inserted for the plurality of carriers modulated with the information signal, and detects a disturbing signal included in the signal received, comprising:
an IFFT computing unit for performing an IFFT computation for a transmission line characteristic calculated from the pilot signal;
a threshold processing part that compares a time-base signal obtained as a result of an IFFT computation by the IFFT computing unit, with a threshold, and if the time-base signal is smaller than the threshold, substitutes zero for a value of the signal;
an FFT computing unit that performs an FFT computation for the signal processed by the threshold processing part and converts to a frequency-base signal;
a subtraction processing part that subtracts the frequency-base signal obtained from the FFT computing unit, from a signal of the transmission line characteristic calculated from the pilot signal;
an interference detector that interpolates timewise and frequencywise the frequency-base signal obtained from the subtraction processing part, and calculates a disturbing signal added to an OFDM signal band;
a windowing part that multiplies the transmission line characteristic calculated from the pilot signal, by a window function; and
an inverse windowing part that multiplies the frequency-base signal obtained from the FFT computing unit, by an inverse number of the window function multiplied in the windowing part.

6. The disturbing signal detecting device as claimed in claim 5, further comprising:
a signal quality calculating part that calculates an average value of information on the frequencywise disturbing signal obtained from the interference detector, as a level of a disturbing signal for an entire band of a signal received.

7. The disturbing signal detecting device as claimed in claim 5, further comprising:
a signal quality calculating part that calculates an average value of information on the frequencywise disturbing signal obtained from the interference detector, as a level of a disturbing signal for an entire band of a signal received.

8. A disturbing signal detecting device in which a plurality of carriers having frequencies orthogonal to each other in a transmission band are modulated with allocated information signal, the device receives an OFDM transmission signal with a known pilot signal periodically inserted for the plurality of carriers modulated with the information signal, and detects a disturbing signal included in the signal received, comprising:
a transmission line estimating part that obtains a transmission line characteristic calculated from pilot signals, and interpolates timewise and frequencywise the transmission line characteristic calculated from the pilot signal, based on an arrangement rule of the pilot signal;
an IFFT computing unit that performs an IFFT computation for a signal indicating a transmission line characteristic of all OFDM carriers obtained from the transmission line estimating part;
a threshold processing part that compares a time-base signal obtained as a result of an IFFT computation by the IFFT computing unit, with a threshold, and if the time-base signal exceeds the threshold, substitutes zero for a value of the signal;
an FFT computing unit that performs an FFT computation for the signal processed by the threshold processing part and converts to a frequency-base signal;
a windowing part that multiplies the transmission line characteristic derived by the transmission line estimating part, by a window function; and
an inverse windowing part that multiplies the frequency-base signal obtained from the FFT computing unit, by an inverse number of the window function multiplied in the windowing part.

9. An OFDM receiver that includes:
a received signal FFT computing unit that converts a received signal to a frequency-domain signal;
a pilot extractor that extracts a pilot signal from the frequency-domain signal and calculates a transmission line characteristic of a carrier in which the pilot signal existed;
a transmission line characteristic estimating part that interpolates timewise and frequencywise the transmission line characteristic calculated by the pilot extractor, and calculates an estimate for a transmission line characteristic of all OFDM carriers;
a divider that divides the output from the received signal FFT computing unit, by the estimate for the transmission line characteristic;
a soft decision part that calculates likelihood based on a distance from a transmitted signal point to a received signal point; and
an error correcting part that performs error correction using the likelihood, further comprising the disturbing signal detecting device as claimed in claim 8, wherein the OFDM receiver corrects the likelihood according to the disturbing signal calculated by the FFT computing unit included in the disturbing signal detecting device.

10. The disturbing signal detecting device as claimed in claim 8, further comprising:
a signal quality calculating part that calculates an average value of information on the frequencywise disturbing signal obtained from the FFT computing unit, as a level of a disturbing signal for an entire band of a signal received.

11. The disturbing signal detecting device as claimed in claim 8, further comprising:
a signal quality calculating part that calculates an average value of information on the frequencywise disturbing signal obtained from the FFT computing unit, as a level of a disturbing signal for an entire band of a signal received.

12. A disturbing signal detecting device in which a plurality of carriers having frequencies orthogonal to each other in a transmission band are modulated with allocated information signal, the device receives an OFDM transmission signal with a known pilot signal periodically inserted for the plurality of carriers modulated with the information signal, and detects a disturbing signal included in the signal received, comprising:
a transmission line estimating part that obtains a transmission line characteristic calculated from pilot signals, and interpolates timewise and frequencywise the transmission line characteristic calculated from the pilot signal, based on an arrangement rule of the pilot signal;
an IFFT computing unit that performs an IFFT computation for a signal indicating a transmission line characteristic of all OFDM carriers obtained from the transmission line estimating part;
a threshold processing part that compares a time-base signal obtained as a result of an IFFT computation by the IFFT computing unit, with a threshold, and if the time-base signal is smaller than the threshold, substitutes zero for a value of the signal;
an FFT computing unit that performs an FFT computation for the signal processed by the threshold processing part and converts to a frequency-base signal; and
a subtraction processing part that subtracts the frequency-base signal obtained from the FFT computing unit, from a signal transmission line characteristic calculated from pilot signals;
a windowing part that multiplies the transmission line characteristic derived by the transmission line estimating part, by a window function; and
an inverse windowing part that multiplies the frequency-base signal obtained from the FFT computing unit, by an inverse number of the window function multiplied in the windowing part.

13. An OFDM receiver that includes:
a received signal FFT computing unit that converts a received signal to a frequency-domain signal;
a pilot extractor that extracts a pilot signal from the frequency-domain signal and calculates a transmission line characteristic of a carrier in which the pilot signal existed;
a transmission line characteristic estimating part that interpolates timewise and frequencywise the transmission line characteristic calculated by the pilot extractor, and calculates an estimate for a transmission line characteristic of all OFDM carriers;
a divider that divides an output from the received signal FFT computing unit, by the estimate for the transmission line characteristic;
a soft decision part that calculates likelihood based on a distance from a transmitted signal point to a received signal point; and
an error correcting part that performs error correction using the likelihood, further comprising the disturbing signal detecting device as claimed in claim 12, wherein the OFDM receiver corrects the likelihood according to the disturbing signal calculated by the subtraction processing part included in the disturbing signal detecting device.

14. The disturbing signal detecting device as claimed in claim 12, further comprising:
a signal quality calculating part that calculates an average value of information on the frequencywise disturbing signal obtained from the subtraction processing part, as a level of a disturbing signal for an entire band of a signal received.

15. The disturbing signal detecting device as claimed in claim 12, further comprising:
a signal quality calculating part that calculates an average value of information on the frequencywise disturbing signal obtained from the subtraction processing part, as a level of a disturbing signal for an entire band of a signal received.

* * * * *